Patented Apr. 12, 1927.

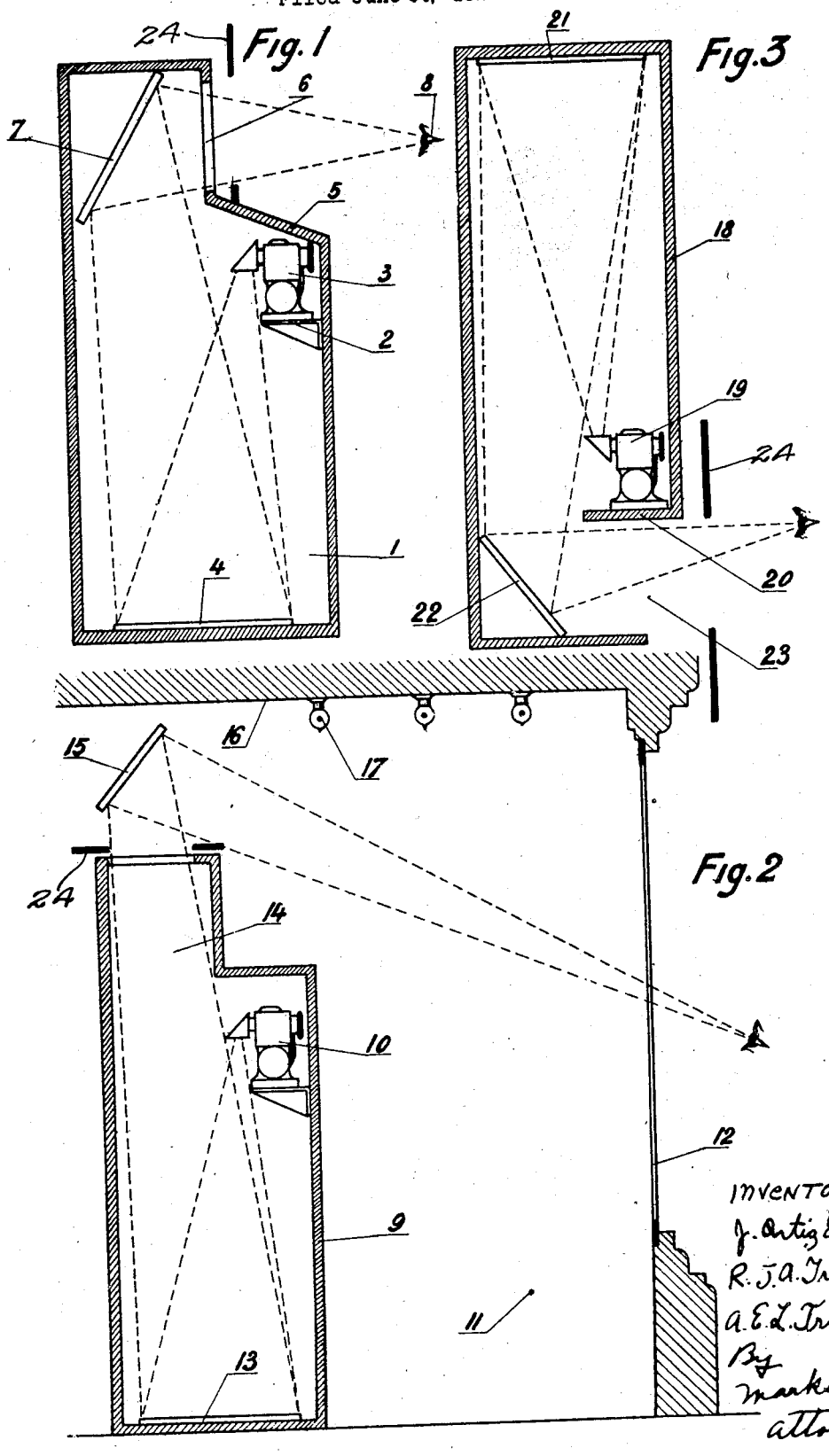

1,624,816

UNITED STATES PATENT OFFICE.

ANDRÉ ELIE LAURENT TRIANA, RODRIGUE JOSEPH ANTOINE TRIANA, AND JUAN ORTIZ-ESCOFET, OF PARIS, FRANCE.

DEVICE FOR PROJECTING STATIONARY OR MOVING PICTURES IN BROAD DAYLIGHT.

Application filed June 30, 1925, Serial No. 40,641, and in France July 30, 1924.

It is well known that pictures such as cinematographic pictures can only be projected in rooms nearly or quite plunged in darkness.

The object of present invention is a device for projecting stationary or moving pictures in broad daylight, for instance in a lighted room, in a lighted shop-window, in the open, etc. In view of this the projecting apparatus is shut up in a sort of a large case or camera obscura and projects the pictures, on a screen placed at the bottom of this case; the pictures are then reflected by a suitably disposed sloping mirror which can be placed either in the case in front of a wide opening thereof, or outside the case. The reflection of the pictures in the mirror is seen by the lookers-on and is as clear in a lit room or out-of-doors as in darkness.

This device can be used for a very great number of purposes; more particularly it can be used in apparatus for examining endless cinematographic films which can be continuously rolled and unrolled.

Several forms of execution of the invention are shown by way of example on appended drawings whereof.

Fig. 1 is a general vertical sectional view of the device as used with the endless films mentioned hereinbefore.

Fig. 2 is a similar view of a modified form of the device as used for projecting pictures in a lighted shop-window.

Lastly Fig. 3 is a vertical sectional view of another form of execution which can be used for nearly all purposes.

In the form of execution as shown in Fig. 1 the whole device is contained inside the box 1 forming a camera obscura and to the front wall of which a bracket 2 is secured. This bracket bears the apparatus 3 projecting the stationary or moving pictures. These pictures are reflected by a prism for total reflection 3' and fall on a screen 4, in any suitable material, placed, on the bottom of the case 1.

A flange 5 of the case is disposed above the projecting apparatus 3 so as to prevent all light from entering the top part of the case 1. Above this flange is a wide opening 6 behind which a mirror 7 is set in a manner such as will provide for the pictures projected on the screen 4 to be easily seen by the lookers-on in front of the case, for instance in 8. The pictures after two reflections are seen erect.

Screens such as 24 placed in front of the opening 6 prevent the mirror 7 from sending back on to the screen 4 enough light to hinder the clearness of the pictures projected on said screen.

In the form of execution shown on Fig. 2 the case 9 containing the projecting apparatus 10 is placed in a shop show-window 11 behind the glass pane 12. The screen is in 13. The case 9 is provided at its rear with a chimney shaped recess 14 above which the mirror 15 is held hung to a device (not shown) secured to the ceiling 16 of the shop-window. Latter can be illuminated for instance by the lamps 17 secured to the ceiling without the clearness of the projection being diminished in the least for the lookers-on in front of the shop-window.

For most purposes the device as shown on Fig. 3 will be more advantageous than the forms of execution described hereinabove.

The case 18 is placed vertically and the projecting apparatus 19 is secured to an inner flange 20 provided near the bottom of said case. The screen 21 is secured to the top of the case and, the mirror 22 at the lower part in front of the opening 23.

The case 18 could also be placed horizontally. The arrangement would be the same as that described just above, the Fig. 3 being considered as a plan view instead of a vertical sectional view.

If a sufficient size is given to the case the projected pictures can be seen at the same time by a great number of lookers-on.

Sometimes, it may be of interest to make the cinematographic apparatus project the pictures on the screen by means of reflecting screens disposed on the wall of the case instead of projecting them directly.

What we claim is:

A device for projecting pictures in broad daylight comprising a case provided with an aperture at one end, a screen disposed inside the case at the other end thereof, a bracket inside the case between the screen and the aperture, a projecting apparatus borne by said bracket, a prism for total reflection adapted to reflect the pictures projected by the said apparatus on to the screen and a mirror disposed outside the case in front of the aperture thereof and adapted to reflect the screen in view of showing the pictures to persons outside the casing.

In testimony whereof we affix our signatures.

ANDRÉ ELIE LAURENT TRIANA.
RODRIGUE JOSEPH ANTOINE TRIANA.
JUAN ORTIZ-ESCOFET.